United States Patent [19]

Stevenson

[11] Patent Number: 4,512,783
[45] Date of Patent: Apr. 23, 1985

[54] GAS EXTRACTOR

[75] Inventor: Charles K. Stevenson, Wichita, Kans.

[73] Assignee: Midland Gas Extractors, Inc., Wichita, Kans.

[21] Appl. No.: 573,288

[22] Filed: Jan. 23, 1984

[51] Int. Cl.³ .............................................. B01D 49/00
[52] U.S. Cl. ........................................ 55/160; 55/200; 55/206; 55/217; 55/DIG. 10
[58] Field of Search ................. 55/160, 175, 176, 200, 55/206, 210, 215, 217, DIG. 10

[56] References Cited

U.S. PATENT DOCUMENTS

| | | | |
|---|---|---|---|
| 2,942,689 | 6/1960 | Walker et al. | 55/160 |
| 3,025,928 | 3/1962 | Heath | 55/200 |
| 3,094,401 | 6/1963 | Lidell | 55/206 |
| 4,198,214 | 4/1980 | Heath | 55/160 |
| 4,424,068 | 1/1984 | McMillan | 55/206 |

Primary Examiner—John Adee
Attorney, Agent, or Firm—Edward L. Brown, Jr.

[57] ABSTRACT

A gas extractor for processing crude oil to provide the energy to power an internal combustion engine driving a conventional oil pumping unit. the extractor comprises a vertical tank, an extractor chamber, an exhaust gas pipe passing through the tank with a plurality of baffle pans mounted longitudinally thereon; a crude oil reservoir in the top of the tank, valve means controlling the rate of oil flow from the reservoir to the upper baffle pan; means to vary the amount of exhaust gases passed through the exhaust pipe to control the temperature of the extractor chamber; a gas outlet passage, air inlet passage and oil drain passages in the extractor chamber, each adjacent baffle pan being oppositely tilted and having a drain opening at its lower side whereby the oil passing through the extractor flows across each adjacent oil pan before being drained from the extractor.

10 Claims, 4 Drawing Figures

GAS EXTRACTOR

BACKGROUND OF THE INVENTION

The operation of low volume oil wells has always been an economical problem and more particularly so today with the increased cost of energy to power the pumping unit. Oil well pumping units can be run by electric motors, diesel or gasoline engines, or a gas-driven engine. An ideal well would be one that produced both oil and gas in sufficient amounts so that the engine running the pumping unit could be driven strictly from the gas. Many stripper wells, which are marginal low-volume wells, must sometimes be shut down and capped because the cost of energy to run the pumping unit exceeds the profit potential of the well. With the current high cost of bottled gas, many of these stripper wells can no longer be operated.

The present invention can be utilized in these marginal stripper wells whereby the oil pumped from the well can be run through a gas extractor whereby the light hydrocarbons can be removed from the crude without substantially affecting the specific gravity of the oil and provide an energy source for powering the pumping unit. These light hydrocarbons would include the gases of ethane, methane, butane, propane and isobutane.

Oil pumping units are basically unattended, and therefore the extractor and its related sources of oil, exhaust gas, air, etc., must be automatically controlled so that the pumping unit continues to operate for long periods of time in the absence of an operator. While this basic idea of generating gas at the well for operation of the pumping unit has previously been attempted, it has never reached any proportions of commercial success. With the use of a thermostatic control on the extractor, the optimum extraction level for the light hydrocarbons can be controlled, even in varying weather conditions. Also, with the control of outside air drawn into the extractor, the gaseous fuel to air ratio can be adequately controlled to provide reliable long term operation.

SUMMARY OF THE INVENTION

Once the extractor and pumping unit are in operation, a thermostat in the extractor chamber maintains a constant temperature by regulating the amount of exhaust gas flow from the internal combustion engine driving the pumping unit. The flow rate of the oil through extractor is controlled by a valve in the oil reservoir located in the top portions of the extractor tank which passes the oil to a series of baffle pans which are longitudinally spaced within the extractor chamber. Each baffle pan surrounds the heated exhaust pipe passing up through the extractor and is alternately tilted from one side to the other with a drain opening at the low side of the pan. After the oil flows across the pan from the high side to the low side, it exits through a drain opening to the high side of the adjacent baffle pan. Located inside the exhaust pipe is a deflector partition which extends longitudinally up through the exhaust pipe in contact therewith to optimize the amount of heat transfer from the exhaust gases passing through the pipe and the oil which flows through the series of baffle pans in the extractor. As the oil collects in the bottom of the extractor, it is drained back to the well head and returned to the bottom of the well, or returned to an oil storage facility.

It is therefore the principal object of the present invention to provide a crude oil gas extractor of the light hydrocarbons to power an oil well pumping unit.

Another object of the present invention is to provide an energy source at the well head for powering the pumping unit which is sufficiently reliable for unattended operation and varying surrounding conditions.

The advantages and objects of the invention will become evident from the following detailed description of the drawing when read in connection with the accompanying drawing which illustrates a preferred embodiment of the invention.

BRIEF DESCRIPTION OF THE PREFERRED EMBODIMENT

Figure 1:
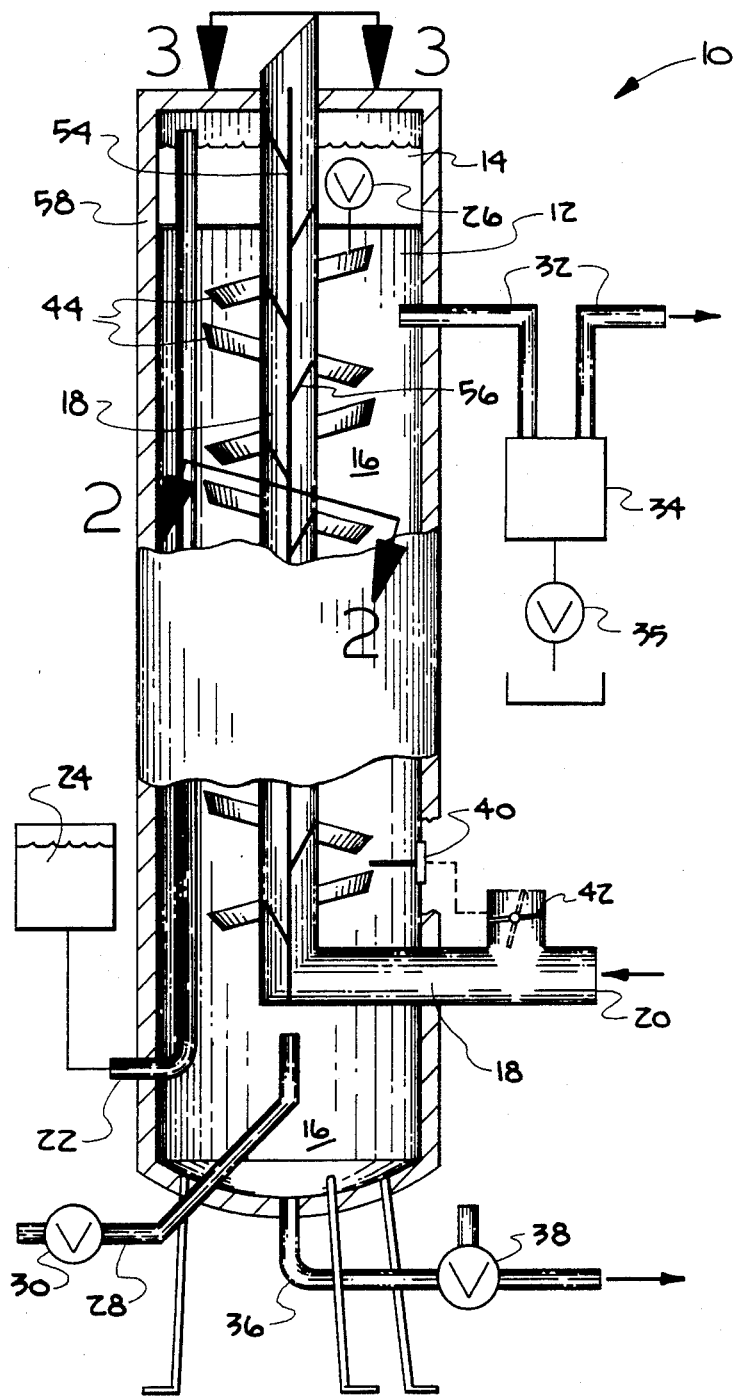
FIG. 1 is an elevational view of the extractor unit of the present invention with partial sections broken away to show the interior structure and with various components symbolically shown.

In FIG. 1 of the drawing, the gas extractor of the present invention is generally described by reference numeral 10. The extractor 10 is situated on an oil well site adjacent a conventional pumping unit and internal combustion engine for powering the pumping unit, neither of which are shown in the drawing but are well known in the prior art.

The extractor unit 10 comprises a vertical tank 12 having a reservoir 14 located in the top portion thereof. Positioned below the reservoir 14 is an extractor chamber 16 which fills the remainder of the tank 12. Passing up through the center of the extractor unit 10 is an exhaust pipe 18 which enters approximate the bottom thereof and exits through the top tank 12 to atmosphere. The inlet end 20 of the exhaust pipe is connected with the exhaust gases discharged from the internal combustion engine, not shown, previously mentioned. Entering the lower left side of the tank 12 is an oil supply line 22 which supplies reservoir 14 from an oil storage tank 24. Located at the bottom of reservoir 14 is a flow rate valve 26 which controls the rate of oil flow through the extractor 10. Also entering the lower left side of tank 12 is an air intake line 28 connected to atmosphere. Located in line 28 is a valve 30 which controls the gaseous fuel/air ratio that is drawn out of chamber 16 through the gas outlet line 32, located at the upper right side of tank 12. Gas line 32 is connected to the carburetor or intake manifold of the internal combustion engine which powers the pumping unit, not shown in the drawing. Located in gas outlet line 32 is a water separator trap 34 including a drain valve 35 located therein. Located at the bottom of chamber 16 is an oil drain line 36 which drains the crude oil either back down into the well or to a separate storage tank. Located in drain line 36 is a vacuum breaker valve 38 which prevents the gas in chamber 16 from being drawn through the drain line 36 if there is a vacuum in line 36. On the right side of extractor chamber 16 is a temperature thermostat 40 which controls a butterfly valve 42 for opening and closing exhaust pipe 18 to atmosphere. Thermostat 40 will hold butterfly valve 42 closed until the temperature level in chamber 16 reaches the optimum temperature, at which time the butterfly valve will open and bypass the exhaust gases so as to maintain a constant temperature level in chamber 16.

Figure 2:
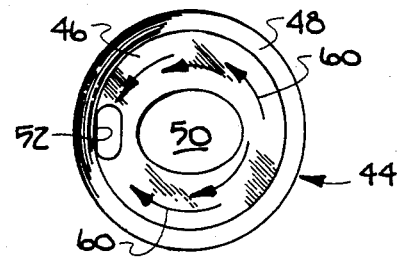
FIG. 2 is a sectional view taken along line 2—2 of FIG. 1 illustrating the detail of the baffle pan structure.
Figure 3:
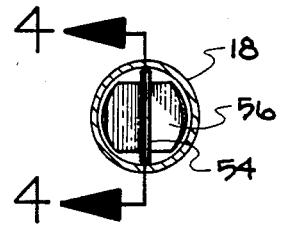
FIG. 3 is taken along line 3—3 of FIG. 1, illustrating the exhaust gas pipe and interior.
Figure 4:
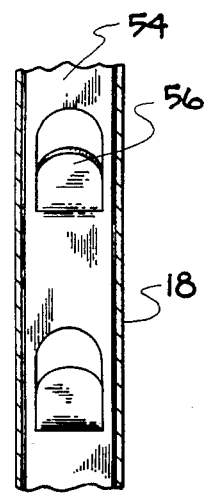
FIG. 4 is a partial longitudinal section taken along lines 4—4 of FIG. 3.

Longitudinally spaced up the length of exhaust pipe 18 are a plurality of baffle pans 44 which are alternately tilted from the horizontal in opposite directions, as seen in FIG. 1. FIG. 2 illustrates a top view of the baffle pan 44 which comprises a flat bottom 46 with an upturned edge 48 therearound, and an oblong opening 50 in the center thereof. Located on one side of the pan bottom is a drain opening 52. The shape of opening 50 allows the baffle pan 44 to be tilted off the horizontal while maintaining edge contact with the exhaust pipe 18 around the perimeter of opening 50. The pans 44 are welded in place on pipe 18. Positioned inside the exhaust pipe 18 is a longitudinal partition 54 having a series of outwardly turned tabs 56 thereon which deflect the hot exhaust gases passing up through the pipe while increasing the surface area of contact with the moving gases. FIGS. 3 and 4 best illustrate the partition 54 and its respective tabs.

Surrounding tank 12 is a layer of insulation 58 which can be made from a variety of materials which retains the heat within the extractor chamber during the cold season of the year.

OPERATION

An alternate source of energy such as propane or gasoline is initially required to start the engine until the gas extractor 10 is heated up and begins to generate gas. With the hot exhaust gases entering the inlet end 20 of exhaust pipe 18, the chamber 16 begins to heat up with the butterfly valve 42 being closed. When the optimum temperature is reached in the extractor chamber 16, thermostat 40 signals valve 42 to open, bypassing the exhaust gases to atmosphere.

The heat energy in the exhaust gases is transmitted to the baffle pans 44 through not only exhaust pipe 18 but also through contact with partition 54 and tabs 56. The amount of heat transfer is enhanced by the eddy effect created by the tabs 56 as they deflect the gases forcing them through a restricted flow path around each tab.

The crude oil which is treated by the gas extractor 10 can be drawn from an adjacent storage tank 24 which supplies reservoir 14 through an oil supply line 22. The crude oil can either be pumped or moved by gravity flow. The flow rate of the oil through the extractor 10 is controlled by the setting of valve 26 which passes the oil from reservoir 14 into the first baffle pan 44 located at the top of the extractor chamber 16. As the oil contacts the first pan, it flows across the bottom 46 of the pan to the opposite side as indicated by the arrows 60 in FIG. 2, due to the tilting of pan 44. As the oil reaches the opposite side of pan 44, it exits through drain opening 52 and falls upon the bottom 46 of the next lower pan. Since the next pan is tilted in the opposite direction, the oil again flows across the bottom 46 to the opposite side and exits a similar drain opening 52 and flows into the next pan. As the oil exits the last pan 44 in the extractor chamber 16, it collects in the bottom of extractor chamber 16 and flows out through drain line 36. Line 36 can be connected back into the well head so that the oil flows back down the well or the alternative would be to drain it into a second storage tank, not shown in the drawing. If there is any suction on the oil flowing out of drain line 36, vacuum breaker valve 38 will open to atmosphere and allow air to be sucked in, thereby preventing the gas in extractor chamber 16 from being drawn out through drain line 36.

As the oil flows down through the heated baffle pans 44, the lighter hydrocarbons in the crude oil gassify and separate from the oil. The vacuum from the engine carburetor sucks the gas from the extractor chamber 16 through gas outlet line 32 via water separator trap 34. As the gas is sucked out through line 32, air is drawn into the bottom extractor chamber 16 via an air intake line 28. The gaseous fuel/air ratio flowing into the internal combustion engine is controlled by resstrictor valve 30 in the air intake line 28.

The thermostat 40 is set at a relatively low temperature level so that it draws off only the ligher hydrocarbons which does not notably affect the specific gravity of the crude oil. When the temperature level in the extractor chamber 16 reaches its maximum temperature, butterfly valve 42 opens and begins to bypass to atmosphere the heated exhaust gases from the engine. Butterfly valve 42 is moved by a servo, not illustrated, which is controlled by thermostat 40. The temperature range for the light hydrocarbons is between 120° F. and 200° F.

The tilt angle, from the horizontal, of pan 44 can be between 5° and 15° depending upon the viscosity of the crude oil. The tilt angle is sufficiently flat so that the oil flows laterally across the total bottom area 46 of the pan before exiting opening 52. Numerous other types of valves, such as a slide type valve, will work in place of butterfly valve 42. Also, any other means which would regulate the amount or temperature of exhaust gases passing through extractor 10 would work equally as well.

As is apparent from the foregoing specification, the present invention is susceptible of being embodied with various alterations and modifications which may differ, particularly from those that have been described in the preceding specification and description. For this reason, it is to be fully understood that all of the foregoing is intended to be merely illustrative and is not to be construed or interpreted as being restrictive or otherwise limiting to the present invention, except as it is set forth and defined in the appended claims.

What is claimed is:

1. An oil well gas extractor which treats the crude oil from the well and utilizes the heat from the exhaust gases of the internal combustion engine driving the pumping unit, the extractor including:

a vertical tank having an extractor chamber therein;

a crude oil reservoir located in the top portions of said tank, a supply line connecting a source of crude to the reservoir;

a first valve means in the reservoir controlling the oil flow rate from the reservoir to the extractor chamber;

an exhaust pipe passing longitudinally up through the vertical tank to atmosphere, the inlet end of the exhaust pipe connected to the exhaust gases from said engine;

temperature sensing means in the chamber;

a second valve means in the exhaust pipe positioned upstream of the tank, opening to atmosphere;

servo means controlled by the temperature sensing means which opens and closes the second valve means so as to bypass the exhaust gases and maintain a constant temperature in the extractor chamber;

a gas outlet passage in the extractor chamber connected to the intake of said engine;

an oil drain line at the bottom of the extractor chamber; the improvement comprising:

a controlled air inlet passage in the extractor chamber; and a plurality of baffle pans longitudinally positioned along the exhaust pipe in concentric relation to the axis of the pipe, each adjacent pan being oppositely tilted from the horizontal and having a drain opening in the lower side thereof whereby the oil flowing from one pan to the next flows across the bottom of each pan before draining to the next adjacent pan.

2. An oil well gas extractor as set forth in claim 1, wherein the baffle pans have a flat bottom, a turned up outer edge and an oblong opening in the center thereof for passage of the exhaust pipe.

3. An oil well gas extractor as set forth in claim 1, wherein the baffle pans having a flat bottom, a turned up outer edge, an oblong opening in the center thereof for passage of the exhaust pipe, the opening being of sufficient dimension to substantially contact the exhaust pipe when in its tilted position.

4. An oil well gas extractor as set forth in claim 1, including a longitudinal partition positioned in the exhaust pipe including tabs partially cut out of said partition and bent outward so as to cause the gases passing through the exhaust pipe to deflect therearound.

5. An oil well gas extractor as set forth in claim 1, including a longitudinal partition positioned in the exhaust pipe including tabs partially cut out of said partition and bent outward so as to cause the gases passing through the exhaust pipe to deflect therearound wherein the side edges of the longitudinal partition are in substantial contact with the exhaust pipe thereby increasing the surface area of the exhaust pipe exposed to exhaust gases.

6. An oil well gas extractor as set forth in claim 1, including vacuum breaker means positioned in the oil drain line which prevents the suction of any gases from the extractor when there is a suction on the oil drain line.

7. An oil well gas extractor as set forth in claim 1, wherein the controlled air inlet passage is located approximate the bottom of the extractor chamber and includes a third valve means for controlling the air/gas ratio which is drawn out the gas outlet passage.

8. An oil well gas extractor as set forth in claim 1, including a water trap separator in the gas outlet passage.

9. An oil well gas extractor as set forth in claim 1, wherein the angle of tilt from the horizontal of the baffle pans is in a range between 5 and 15 degrees.

10. An oil well gas extractor which treats the crude oil from the well and utilizes the heat from the exhaust gases of the internal combustion engine driving the pumping unit, the extractor including:

a vertical tank having an extractor chamber therein;

a crude oil reservoir located in the top portions of said tank, a supply line connecting a source of crude to the reservoir;

a first valve means in the reservoir controlling the oil flow rate from the reservoir to the extractor chamber;

an exhaust pipe passing longitudinally up through the vertical tank to atmosphere, the inlet end of the exhaust pipe connected to the exhaust gases from said engine;

temperature sensing means in the chamber;

a second valve means in the exhaust pipe positioned upstream of the tank, opening to atmosphere;

a gas outlet passage in the extractor chamber connected to the intake of said engine;

an oil drain line at the bottom of the extractor chamber;

the improvement comprising:

a controlled air inlet passage in the extractor chamber; and a plurality of baffle pans longitudinally positioned along the exhaust pipe in concentric relation to the axis of the pipe, each adjacent pan being oppositely tilted from the horizontal and having a drain opening in the lower side thereof whereby the oil flowing from one pan to the next flows across the bottom of each pan before draining to the next adjacent pan.

* * * * *